(12) United States Patent
McGuire

(10) Patent No.: US 7,856,394 B2
(45) Date of Patent: Dec. 21, 2010

(54) COMPUTER SYSTEM AND A METHOD FOR MANAGING A FINANCIAL TRANSACTION

(75) Inventor: Simon McGuire, London (GB)

(73) Assignee: UBS AG, Zurich (CH)

( * ) Notice: Subject to any disclaimer, the term of this patent is extended or adjusted under 35 U.S.C. 154(b) by 1454 days.

(21) Appl. No.: 09/943,905

(22) Filed: Aug. 31, 2001

(65) Prior Publication Data
US 2002/0107771 A1 Aug. 8, 2002

(30) Foreign Application Priority Data
Dec. 5, 2000 (DE) ................................ 100 60 362

(51) Int. Cl.
*G06Q 40/00* (2006.01)
(52) U.S. Cl. ...................................... 705/37; 705/36 R
(58) Field of Classification Search ............. 705/35–38, 705/35 R–38 R
See application file for complete search history.

(56) References Cited

U.S. PATENT DOCUMENTS

| | | | |
|---|---|---|---|
| 5,765,141 A | 6/1998 | Spector | 705/14 |
| 5,892,900 A * | 4/1999 | Ginter et al. | 726/26 |
| 6,148,293 A * | 11/2000 | King | 705/35 |
| 6,292,788 B1 * | 9/2001 | Roberts et al. | 705/36 T |
| 6,393,415 B1 * | 5/2002 | Getchius et al. | 707/2 |
| 6,778,968 B1 * | 8/2004 | Gulati | 705/36 R |
| 7,177,833 B1 * | 2/2007 | Marynowski et al. | 705/38 |
| 7,567,909 B1 * | 7/2009 | Billingsley | 705/1 |

FOREIGN PATENT DOCUMENTS

WO WO 00/72206 11/2000

OTHER PUBLICATIONS

Delta Financial Takes a Net Loss in Second Quarter Due to MBS Woes. Amilda Dymi. National Mortgage News. New York: Sep. 11, 2000. vol. 24, Iss. 51; p. 32.*
Abstract for DE 196 49 380 dated Nov. 29, 1996.
Exchange-traded fund (ETF), http://en.wikipedia.org/wiki/Exchange-traded_fund (last modified Aug. 17, 2008).

* cited by examiner

*Primary Examiner*—Hani Kazimi
*Assistant Examiner*—Clement B Graham
(74) *Attorney, Agent, or Firm*—Proskauer Rose LLP

(57) ABSTRACT

The invention relates to a computer system and a method for managing a financial transaction between an issuer of a note and an investor buying the note, wherein the note is exchanged into one or more exchange traded items of the issuer's portfolio. The computer system comprises an index database for storing data relating to a specific time varying benchmark index, an item database for storing data relating to the exchange traded items to be exchanged, a calculating unit for calculating an exchange ratio between the note and at least one exchange traded item to be delivered to the investor based on at least a current level of the benchmark index and a current price of the at least one exchange traded item, and a transaction unit for delivering at least one exchange traded item in accordance with the exchange ratio to the investor upon an exchange request of either the issuer or the investor or upon maturity of the note.

21 Claims, 3 Drawing Sheets

COMPUTER SYSTEM AND A METHOD FOR MANAGING A FINANCIAL TRANSACTION

CROSS-REFERENCE TO RELATED APPLICATIONS

This application claims priority to German patent application no. 100 60 362.9 filed Dec. 5, 2000 and entitled "A Computer System and a Method for Managing a Financial Transaction".

BACKGROUND

1. Technical Field

The invention relates to a computer system and a method for managing a financial transaction between an issuer of a note and an investor buying the note, the note being exchangeable into one or more exchange traded items like stocks, stock options, etc. which are contained in a portfolio of the issuer.

2. Discussion of the Prior Art

The complexity and the variety of many financial transactions necessitate a computerization of the financial transactions and consequently the use of computer systems. As a result, computer systems are widely employed in the financial sector and fulfill a plurality of tasks in context with performing financial transactions in a fast and secure manner.

Several computer systems and computerized methods are e.g. known for assisting a corporation in unwinding a portfolio of one or more exchange traded items. In the following, computer systems for selling stocks included within a corporation's portfolio of exchange traded items are described as examples of computer systems configured to manage financial transactions. Generally, the computer systems become increasingly sophisticated with an increasing complexity of the underlying financial transaction.

The simplest example for unwinding a portfolio of stocks is to sell the stocks directly to the market. For this purpose computerized trading systems having a comparatively simple construction may be used. Consequently, selling shares directly to the market by means of computerized trading systems is in most cases rather uncomplicated as far as the technical side is concerned although this tends to cause the seller to be liable to capital gains tax.

As a second example for computer systems which assist a corporation in unwinding a portfolio, computer systems which manage transactions in context with exchangeable bonds have to be mentioned. An exchangeable bond is a debt obligation of the issuing corporation, giving the buying investor the right, but not the obligation, to convert that bond into a fixed number of stocks of the corporation's portfolio until the bond's maturity date. Due to the higher degree of complexity of exchangeable bonds, computer systems for managing transactions like the issue of an exchangeable bond are more complex than computerized trading systems for selling stocks directly to the market.

As pointed out above, the computerized management of transactions relating to exchangeable bonds gives the investor the option to let the bond redeem in order to get the money back. An investor would make use of this option if the stocks underlying the exchangeable bond do not raise sufficiently for them to elect to convert the bond into stocks. In other words, exchangeable bonds are not certain to convert into stocks, meaning that credit rating agencies count the issue of exchangeable bonds towards debt in their assessment of the issuing corporation. Counting the issue towards debt, however, worsens the issuing corporation's credit rating.

As a third example for unwinding a corporation's portfolio of stocks by means of computerized financial transactions is the issue of a mandatory exchangeable bond. The issue of a mandatory exchangeable bond is guaranteed to convert into stocks of the corporation's portfolio within a predefined period of time. Unlike the classical exchangeable bonds described above, mandatory exchangeable bonds thus ensure conversion into stocks. However, mandatory exchangeable bonds have the drawback that investors demand a very high interest rate during the life of mandatory exchangeable bonds since the investors are forced to receive the stocks in the future. Also, due to the sophisticated nature of mandatory exchangeable bonds, these bonds require the use of rather complex computer systems.

As has become apparent from the above, the computer systems currently in use for managing financial transactions between an issuer of a note like an exchangeable bond or a mandatory exchangeable bond and an investor buying the note suffer from several drawbacks. First of all, the nature of the notes implies disadvantages for the issuing corporation which are reflected in the construction and programming of the computer systems. Thus, it is desirable to provide a computer system which is programmed and constructed such that the above drawbacks of a note exchangeable into one or more exchange traded items are avoided. Moreover, there is a need for a computer system appropriately configured in regard to interfaces, input/output components and the like to communicate with its environment such that a financial transaction between an issuer of a note and an investor buying the note can be managed quickly and effectively.

There also exists a need for a method of operating such a computer system which is computerized at least to a large extent and which allows to manage a financial transaction between an issuer of a note and an investor buying the note without the above-mentioned drawbacks. Finally, a computer program for performing such a method is needed.

SUMMARY OF THE INVENTION

The present invention is directed to overcoming the drawbacks of the prior art and satisfies the existing need regarding a computer system by providing a computer system for managing a financial transaction between an issuer of a note and an investor buying the note, wherein the note is exchanged into one or more exchange traded items of the issuer's portfolio, which comprises an index database for storing data relating to a specific time varying benchmark index, an item database for storing data relating to the one or more exchange traded items to be exchanged, a calculating unit for calculating an exchange ratio between the note and at least one exchange traded item of the portfolio based on at least a current level of the benchmark index and a current price of the at least one exchange traded item, and a transaction unit for preferably automatically delivering at least one exchange traded item in accordance with the exchange ratio to the investor upon an exchange request of either the investor or the issuer or upon maturity of the note.

Also, according to the invention a method is provided for managing a financial transaction between an issuer of a note and an investor buying the note, wherein the note is exchanged into one or more exchange traded items of the issuer's portfolio, the method comprising the steps of defining a specific time varying benchmark index and storing data relating to the benchmark index, defining a portfolio of exchange traded items and storing data relating to the one or more exchange traded items to be exchanged, calculating an exchange ratio between the note and at least one exchange traded item of the portfolio based on at least a current level of the benchmark index and a current price of the at least one exchange traded item, and preferably automatically delivering at least one exchange traded item to the investor in accordance with the exchange ratio upon an exchange request of either the issuer or the investor or upon maturity of the note.

The issuer's portfolio may comprise a single or several different exchange traded items. Also, the portfolio may contain exchange traded items which have not yet been issued at the time the note is issued, i.e., exchange traded items which are yet to be issued. Moreover, the portfolio may comprise exchange traded items issued or to be issued by the issuer of the note. As an example, the issuer's own stocks which are yet to be issued or which have already been issued could be comprised in the portfolio.

According to the invention, a financial transaction between an issuer of a note and an investor buying the note is managed quickly and effectively. Additionally, the requirements concerning programming and construction of the computer system can be kept comparatively low while ensuring not only technical advantages but also financial benefits for both the issuer and the investor.

The invention guarantees that upon an exchange request of either the issuer (forced early exchange) or the investor (voluntary early exchange) or upon maturity of the note, the note is mandatorily exchanged into one or more exchange traded items like stocks, stock options, etc. The number of exchange traded items to be delivered and the total value of the delivered exchange traded items are not yet known when the note is issued. This is due to the fact that the number of exchange traded items delivered to the investor is linked to both the performance of a time varying benchmark index like a stock index and to the development of the price of the one or more exchange traded items delivered to the investor. Preferably, the total value of the exchange traded items delivered to the investor is not linked to the development of the price of the one or more exchange traded items delivered to the investor, but is only linked to the performance of the benchmark index. As an example, the total value of the exchange traded items delivered to the investor may be directly linked to the development of the level of the benchmark index such that the investor benefits from an increase of the index level. On the other hand, the number of exchange traded items delivered to the investor may be defined such that the issuer profits when the price of the one or more exchange traded items delivered to the investor increases more than the index level. Thus, in case where index level increases and the exchange traded item delivered to the investor increases more than the index level, both the investor and the issuer of a note benefit from an exchange of the note as will become apparent in more detail from the examples set out below.

The specific benchmark index based on which the exchange ratio between the note and at least one exchanged traded item of the issuer's portfolio is calculated is preferably defined prior to issue of the note and is known to both the issuer and the investor. The benchmark index may be an index reflecting the development of a basket of exchange traded items like a stock index or another market index. After the specific benchmark index has been defined, the corresponding data relating to the type of benchmark index which underlies the transaction between the issuer and the investor may be stored in the index database.

Whereas the benchmark index is preferably specified prior to the issue of the note, this is not necessarily the case for the one or more exchange traded items which are to be delivered to the investor. Preferably, the one or more exchange traded items finally delivered to the investor are specified by the issuer of the note only after the note has been issued. Nonetheless, prior to issue of the note the issuer may specify a portfolio of one or more exchange traded items.

In case a portfolio of exchange traded items is specified, it may be left to the issuer's discretion which of the exchange traded items of the portfolio will finally be delivered in exchange for the note. In other words, after the note has been issued a selection may be made among the one or more exchange traded items contained in the portfolio and only the selected exchange traded items are delivered to the investor. Data relating to the portfolio of one or more exchange traded items may be stored in the item data base.

As has been pointed out above, the exchange ratio between the note and the at least one exchange traded item to be delivered to the investor is calculated based on at least a current level of the benchmark index and a current price of the at least one exchange traded item to be delivered. Therefore, the computer system preferably further comprises interfaces in communication with the one or more relevant markets for obtaining the information necessary for calculating the exchange ratio. As an example, the computer system may comprise an index interface for receiving the current level of the benchmark index and a price interface for receiving the current price of the at least one exchange traded item which is to be delivered to the investor.

The exchange ratio, i.e., the amount of exchange traded items which is to be delivered for each note to the investor, is preferably defined such that the investor benefits from an increase of the index level and that the issuer benefits from an increase of the price of the exchange traded item to be delivered to the investor. As an example, the exchange ratio may take into account the ratio between the index level and the price of the exchange traded item in a certain point in time after issue of the note. Moreover, the exchange ratio may also take into account discount factors in favor of the investor.

Preferably, a calculating unit calculates an exchange ratio r according to $r=I/(x*S)$, wherein I is the current level of the benchmark index, x is a discount factor and S is the current price of the exchange traded item to be delivered. The discount factor x may be chosen such that x equals 1 in the case of voluntary early exchange and x<1, e.g., $0,90<x<0,98$, in the case of forced early exchange or maturity. In the case of x<1, the investor will receive a higher amount of exchange traded items for each note, and the total profit of the investor will be higher, compared to x=1. Consequently, although the investor has the option of voluntary early exchange (x=1), the incentive therefore is rather low since the investor's profit will decrease compared to the profit he will receive at maturity of the note (x<1). In the case a varying discount factor x is introduced, the computer system has to be configured such that a distinction may be made between forced early exchange, voluntary early exchange and maturity of the note.

If the exchange ratio is calculated based on a single value of the current benchmark index level and a single value of the current price of the exchanged traded item, the exchange ratio is highly susceptible to day-to-day changes and to momentary fluctuations. This, of course, increases the risk involved with the note for both the issuer and the investor. In order to compensate day-today fluctuations of the exchange ratio, a preferred embodiment of the invention comprises an averaging unit for averaging the exchange ratio over a predetermined period of time such that the at least one exchange traded item can be delivered to the investor in accordance with the averaged exchange ratio. As an example, the exchange ratio may be averaged over a certain number of business days.

The averaging unit may be in communication with a first timing unit which controls the averaging unit. The averaging may be controlled such that it starts a predetermined period of time after an investor's or an issuer's exchange request or a predetermined period of time prior to maturity of the note.

In order to enable both the investor and the issuer to make an exchange request according to which the note is exchanged prior to its maturity date, the computer system may further comprise an input terminal which allows both the investor and the issuer to input an exchange request. The input may e.g. be made via the Internet or via dedicated communication lines. Since the value of the discount factor may vary depending upon which of the investor and the issuer has input the exchange request, the computer system may further comprise means for analyzing the exchange request and for setting the discount factor in accordance with the analyzation result.

If the one or more exchange traded items which are to be delivered to the investor are not exactly specified prior to issue of the note but are e.g. specified in form of a portfolio of several different exchange traded items, the computer system preferably further comprises a selection unit for automatically selecting the one or more exchange traded items comprised within the portfolio which are to be delivered to the investor and based on which the exchange ratio is calculated. The selection preferably takes place in a closely timed relationship with the exchange of the note, e.g., a few days after receipt of an investor's exchange request or a few days prior to maturity of the note or an issuer's exchange request. In other words, the issuer may reserve the right to pick the one or more exchange traded items he intends to deliver to the investor only shortly before the exchange of the note. The issuer will have the greatest benefits if the selection unit is configured such that the exchange traded item having increased the most since issue of the note is selected.

If the note gives the issuer the right to exchange the note for one of several different exchange traded items of the issuer's portfolio, the computer system advantageously further comprises an output unit for notifying the investor of which exchange traded item has been selected by the selection unit, i.e., which exchange traded item will be delivered to him.

The delivery of the one or more exchange traded items to the investor preferably takes place a predetermined period of time after the computer system receives an exchange request, after the computer system notified the investor or after maturity of the note. For this purpose the computer system may comprise a second timing unit in communication with the transaction unit, the second timing unit controlling the transaction unit such that the at least one exchange traded item is automatically delivered after a predetermined period of time to the investor.

It has become apparent from the above that the investor may profit from both an increase of the benchmark index level and a discount factor x<1. In order to further increase the attractiveness of the note, the computer system may further be configured such that the investor receives a coupon at one or more predetermined coupon dates prior to the maturity of the note. One or more coupon dates may be defined and stored in a coupon database of the computer system. As an example, the investor may annually receive a coupon in the form of a certain percentage of the note's issue price or in the form of a certain percentage or the current index level.

The computer system may further include a monitoring unit for monitoring the coupon date and for delivering the coupon to the investor at each coupon date. The delivery of a coupon to the investor in addition to a possible discount factor guarantees that the note outperforms the benchmark index in spite of the fact that the note's exchange ratio is linked to the performance of the benchmark index. Thus, the note becomes particularly attractive for investors who benchmark their performance to a particular benchmark index. Moreover, even if the issuer delivers an additional coupon to the investor, the coupon to be paid by the issuer for the note is still considerably less than coupons payable for classical exchangeable bonds of for mandatory exchangeable bonds. This is due to the fact that the investor has the possibility to additionally profit from an increase of the benchmark index level because of the linking between the note's exchange ratio and the performance of the benchmark index.

BRIEF DESCRIPTION OF THE DRAWINGS

Further aspects and advantages of the invention will become apparent upon reading the following detailed description of preferred embodiments of the invention and upon reference to the drawings, in which.

DESCRIPTION OF THE PREFERRED EMBODIMENTS

Figure 1:
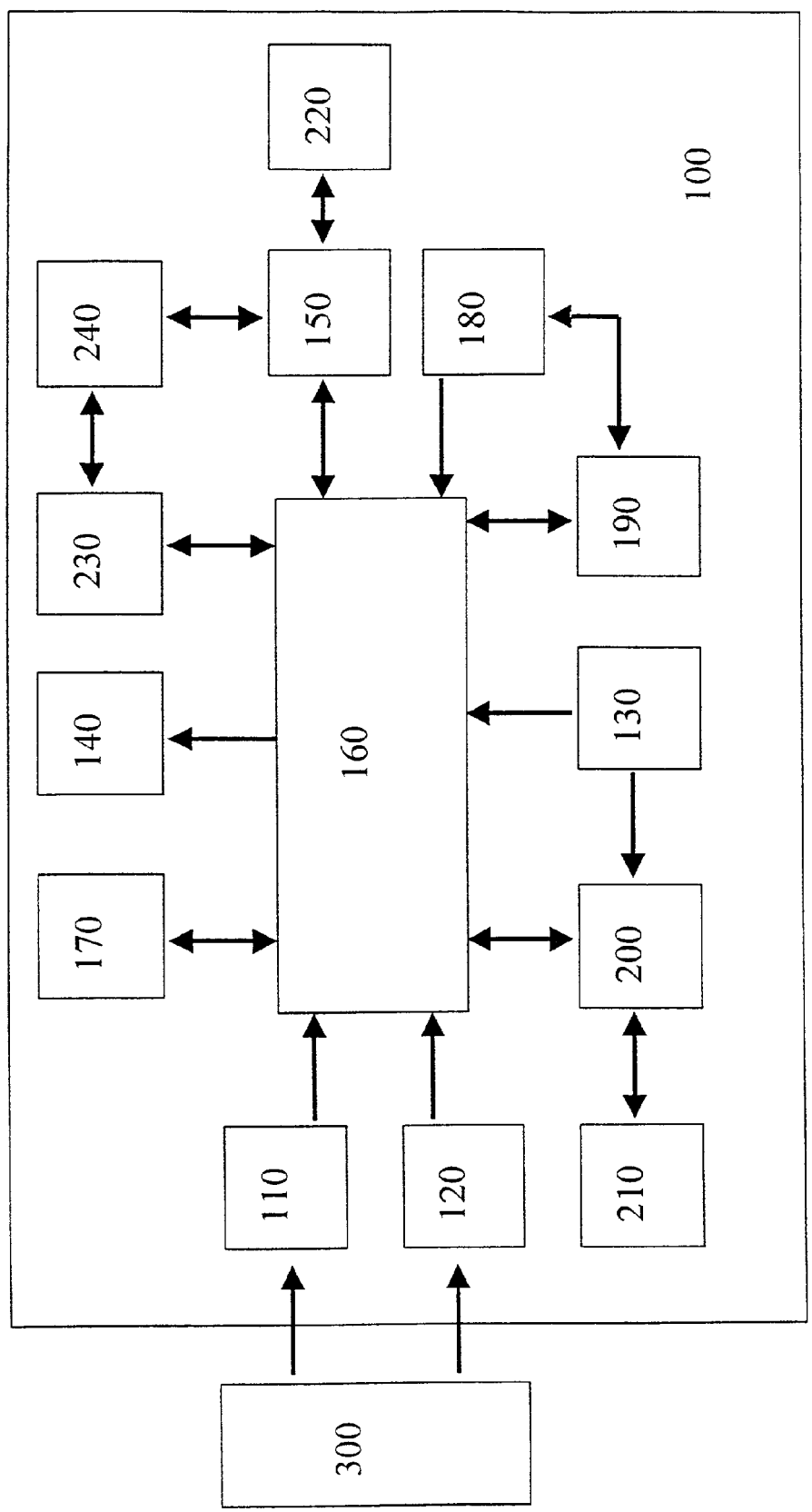
FIG. 1 is a schematic diagram of the computer system of the present invention for managing a financial transaction between an issuer of a note and an investor buying the note.

In FIG. 1 a block diagram of a computer system 100 according to the invention for managing a financial transaction between an issuer of a note and an investor buying the note is illustrated. In the following, the invention is exemplarily described in context with a note which is exchangeable into stocks. Of course, the invention may also apply to the case where the note is exchangeable into a different exchange traded item like a bond, a financial instrument, etc. Moreover, although in the following it is assumed that the exchange traded item to be delivered to the investor is already part of the issuer's portfolio at the time the note is issued, the invention also applies to the case where the issuer does not already dispose of the one or more exchange traded items to be delivered to the investor at the time the note is issued.

The exemplary computer system 100 depicted in FIG. 1 is configured to communicate with its environment by means of an index interface 110 for receiving a current level of a stock index, a price interface 120 for receiving a current price of the at least one stock to be delivered to the investor, an input unit 130 allowing the issuer and the investor to input an exchange request, an output unit 140 for notifying the investor of the type of stock which will be delivered to him and a transaction unit 150 for transferring one or several different stocks from the issuer's portfolio to the investor's portfolio.

Via the index interface 110 and the price interface 120 the computer system 100 receives from a market 300 of exchange traded items like a stock exchange information relating to a current level of a stock index and a current price of the at least one stock to be delivered to the investor. The index interface 110 and the price interface 120 are further in communication with a calculating unit 160 forming the main component of the computer system 100. The calculating unit 160 receives information from the stock exchange 300 via the index interface 110 and the price interface 120. Based upon current information from the stock exchange 300, the calculating unit 160 calculates an exchange ratio between the note and the stocks into which the note will be exchanged. The calculation of the exchange ratio will be described below in more detail.

The calculating unit 160 further communicates with an index database 170 and an item database 180. The index database 170 comprises data relating to the specific type of stock index to which the exchange ratio is linked. This means that the data comprised in the index database 170 specify which benchmark index level to be requested from the stock exchange 300 by the calculating unit 160. The item database 180 defines the issuer's portfolio of stocks that may be delivered to the investor in exchange for the note issued by the issuer. Thus, the item database 180 also specifies the one or more stocks of which the calculating unit 160 requests the current prices from the stock exchange 300 for calculation of the exchange ratio. The item database 180 may either specify a single stock or a portfolio of several different stocks depending on whether or not the issuer wants to reserve the right to select the specific stock to be delivered to the investor only after issue of the note.

In case the item database 180 specifies a portfolio of different stocks, at some point in time after issue, of the note a decision has to be made in respect to which specific stocks from the portfolio are to be delivered to the investor. For this purpose a selection unit 190 is provided which communicates with both the item database 180 and the calculation unit 160. The selection unit 190 automatically selects one or more of the stocks of the issuer's portfolio based on the information stored in the item database 180 and provides the selection result to the calculation unit 160 which then receives the corresponding price of the selected stock from the stock exchange 300 in order to calculate the exchange ratio. The selection unit 190 further communicates with the output unit 140 for the purpose of notifying the investor of the one or more selected stocks to be delivered to him. The output unit 140 may communicate with the investor using any known method including, but not limited to, the Internet or dedicated communication lines.

If the investor's portfolio comprises a plurality of different stocks, the selection unit 190 becomes active in a close timely relationship with maturity of the note or with input of an exchange request by the issuer or the investor via the input unit 130.

The input unit 130 communicates with an averaging unit 200 of the computer system 100. The averaging unit 200 averages the exchange ratio calculated by the calculating unit 160 over a plurality of days in order to level out fluctuations of either the index level or the price of the stocks to be delivered to the investor. The averaging unit 200 is controlled in accordance with a predefined averaging period by a first timing unit 210. The first timing unit 210 ensures that averaging is started a predefined period of time after receipt of an exchange request from the input unit 130 or alternatively after notification of the investors of the one or more stocks to be delivered. In case the averaging unit 200 receives no exchange request, averaging is automatically started shortly before maturity of the note.

Based on the averaged exchange ratio calculated by the averaging unit 200, the transaction unit 150 delivers the one or more stocks selected by the selection unit 190 in accordance with the averaged exchanged ratio to the investor. The transaction unit 150 is configured to automatically book the stocks to be delivered from the issuer's portfolio to the investor's portfolio in accordance with a timing control signal from a second timing unit 220 in communication with the transaction unit 150. The second timing unit 220 controls the transaction unit such that the one or more stocks are automatically delivered a predetermined period of time after receipt of the exchange request, after maturity of the note or after notification of the investor.

The computer system 100 depicted in FIG. 1 is configured to deliver a fixed or variable coupon to the investor at predetermined fined coupon dates to ensure a guaranteed outperformance of the note relative to the stock index. The predefined coupon dates are stored in a coupon database 230 and monitored by a monitoring unit 240 in communication with the coupon database 230. The monitoring unit 240 monitors the coupon dates stored in the coupon database 230 and communicates with the transaction unit 150. The transaction unit 150 delivers the coupon to the investor at each coupon date in accordance with a coupon control signal received from the monitoring unit 240.

Figure 2:
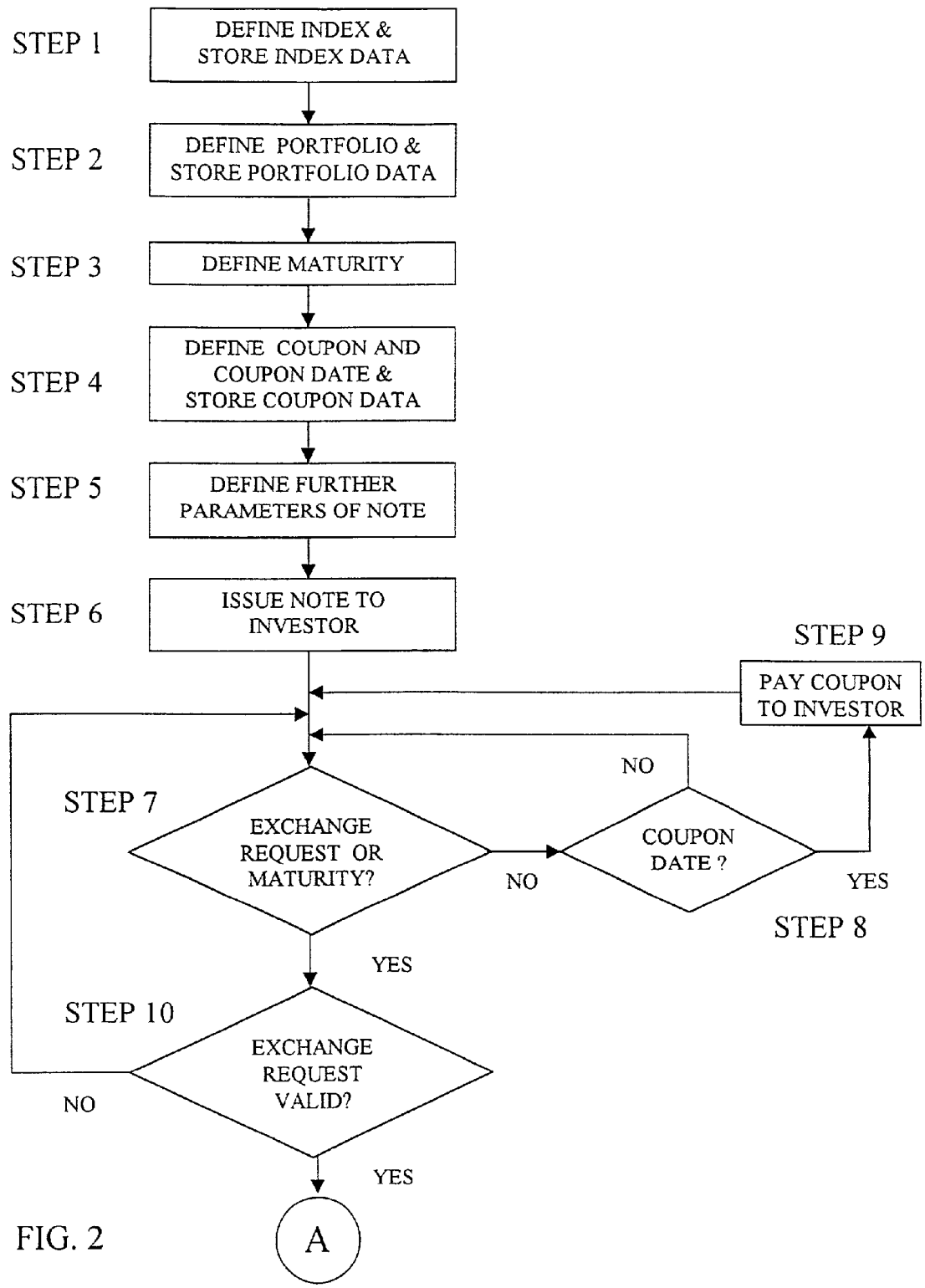
FIGS. 2 and 3 are flow-charts of the method of the present invention for managing a financial transaction between an issuer of a note and an investor buying the note.

Referring now to FIG. 2, a method is shown for managing a financial transaction between an issuer of a note and an investor buying the note, wherein the note is exchanged into stocks of the issuer's portfolio.

Initially, in steps 1 to 5, several values have to be defined and stored in corresponding databases. First of all, in step 1, the stock index underlying the note to be issued is defined. As an example, the German stock index DAX is selected and this selection is stored as index data in the index database 170. Of course, other stock indices or market indices could be selected as well.

Then, in step 2, two stock portfolios are defined and the corresponding portfolio data are stored in the item database 180. The first portfolio represents a first set of stocks into which the note may be exchanged in case of voluntary early exchange and a second portfolio represents a second set of stocks into which the note may be exchanged in case of forced early exchange or at maturity of the note. The two portfolios can be different in respect to the number of different stocks and the type of stocks comprised therein. Of course, the invention can also be practiced using a portfolio comprising only a single type of stock. The stocks constituting a portfolio are preferably liquid blue chip stocks which can be readily monetized by the investor if desired. Thus, the risk for the investor that the stocks delivered by the issuer are unsellable is negligible.

After both the portfolio and the stock index have been defined, the maturity date of the note to be issued is selected in step 3. As an example, the maturity date may be three years from the note's issue date.

Then, in step 4, the coupon and the coupon date are defined. The coupon is a certain percentage of the note's initial price, e.g., 1 or 2%. The coupon is payable annually on the issue day of the note and the coupon date may be correspondingly specified. After the coupon and the coupon date have been defined, corresponding coupon data is stored in the coupon database 230 of the computer system 100.

Further parameters of the note to be issued are defined in step 5. As an example for further parameters, the issue date and the issue price have to be defined. The issue price can be simply the level of the specified stock index at the issue date in a certain currency like Euro. Other parameters to be defined in step 5 are the discount factor for calculating the exchange ratio and the exchange periods during which voluntary early exchange at the investor's request and forced early exchange at the issuer's request are possible.

Of course, the initialization steps 1 to 5 may also be performed in a different order. After the initialization steps 1 to 5 have been performed, the note is issued to one or more investors in step 6.

After the note has been issued to the investor, it is constantly monitored in step 7 if voluntary early exchange or forced early exchange have been requested or if maturity of the note approaches. Moreover, the coupon date is constantly monitored by the monitoring unit 240 based on the data stored in the coupon database 230. At the coupon date, the monitoring unit 240 controls the transaction unit 150 such that the coupon is automatically paid to the investor. Otherwise, monitoring of the input unit 130 in respect to an exchange request and of the note's maturity date is continued in step 7. Should it be determined in step 7 that the issuer or the investor has input an exchange request or that maturity is approaching, the method continues with step 10.

In step 10, it is determined if the issuer's or the investor's exchange request is valid. An exchange request is only valid if it is made during a valid exchange period. According to the exemplary embodiment depicted in FIGS. 2 and 3, the exchange period during which a valid exchange request can be made to start one year after the note's issue date and end 25 business days prior to the note's maturity. If the issuer's or the investor's exchange request is not valid, the method continues with step 7. If, on the other hand, the exchange request is valid or if maturity is approaching, the method continues with step 11.

Figure 3:
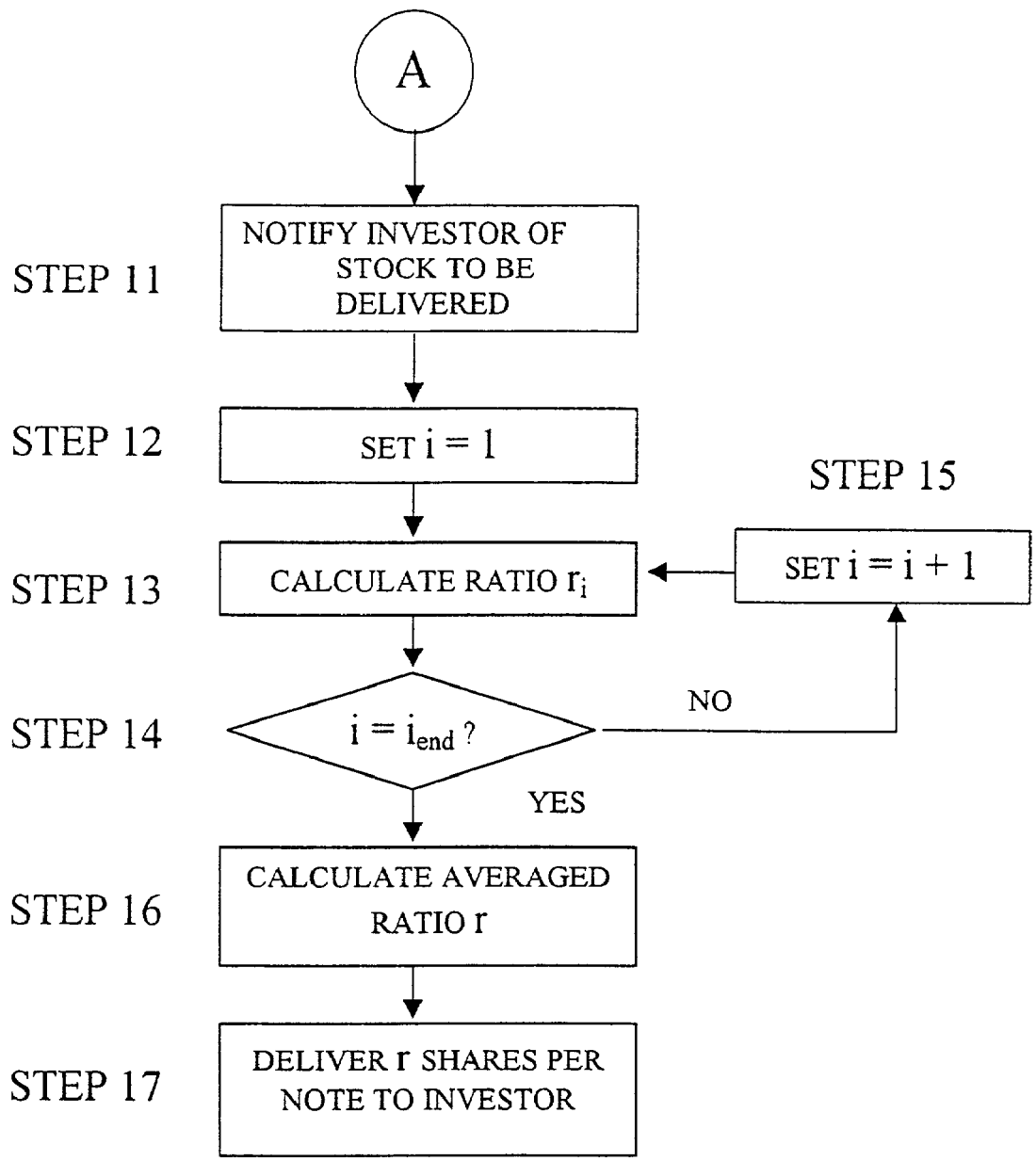

As depicted in FIG. 3, in step 11, the investor is notified by the output unit 140 of the stock to be delivered to him. This implies that the selection unit 190 of the computer system 100 has already selected one or several different stocks of the issuer's portfolio to be delivered to the investor. In the case of a voluntary early exchange, i.e., upon an exchange request of the investor, the selection is made between steps 10 and 11. In case of forced early exchange, i.e., upon an exchange request of the issuer, or upon mandatory exchange at maturity, the selection may take place at any point in time between issue of the note to the investor and notifying the investor of the selected stock. The selection unit 190 makes the selection preferably in a close timely relationship with an exchange request or maturity of the note.

Preferably, specific time periods are set and monitored by the monitoring unit 240 within which the issuer must specify which stocks will be delivered to the investor. As an example, in the case of voluntary and forced early exchange, it can be specified that the issuer must notify the investor of which stocks will be delivered to him within five business days of submission of the exchange request by the investor. In the case of forced early exchange, it can be specified that the issuer must notify the investor of which stocks will be delivered at least five business days prior to start of the averaging period described below in more detail. In the case of mandatory exchange at maturity, it can be specified that the issuer must notify the investor of the stock to be delivered not later than e.g. 25 business days prior to maturity. Of course, if the issuer's portfolio comprises only a single stock and this stock is already known to the investor at the time the note is issued, selection of the specific stock and notification of the investor of the selected stock can be omitted.

From step 11 the method proceeds with the averaging procedure of steps 12 to 16. The averaging procedure is conducted by means of the averaging unit 200 in accordance with a timing control signal from the first timing unit 210. According to the invention, the exchange ratio between the note and the one or more stocks to be delivered to the investor is averaged over several business days. The first timing unit 210 controls the averaging unit 200 such that two days after the issuer makes notification to the investors of the stock to be delivered (step 11), a simple average of the exchange ratio is taken over five business days.

In step 12, a counter i is set to 1 corresponding to the first business day. In step 13 the calculating unit 160 calculates the exchange ratio $r_1$ of the first business day according to $r_1 = 1_1 / (x \cdot S_1)$, wherein $I_1$, is the official closing level of the DAX on the automatic trading system XETRA at the first business day, x is the discount factor and SI is the closing price of the stock to be delivered on XETRA at the first business day. The discount factor x equals 1 in the case of voluntary early exchange and equals 0,95 else. Consequently, the investor gets a 5% discount on the stocks delivered to him on mandatory exchange at maturity or on forced early exchange.

In step 14, it is determined if the counter i equals $i_{end}$. In the present case the average is taken over five business days. Consequently, $i_{end}$ equals 5. If it is found in step 14 that the counter i has not reached $i_{end}$ yet, the counter is increased by 1 in step 15 and at the next business day the exchange ratio $r_{i+1}$, is calculated in step 13. On the other hand, if it is determined in step 14 that $i=i_{end}$, the final exchange ratio r averaged over five consecutive business days is calculated in step 16 by the calculation unit 160.

From step 16 the method proceeds to step 17. In step 17, the transaction unit 150 automatically delivers the stocks selected by the selection unit 190 to the investor in accordance with the averaged exchange ratio r calculated by the calculating unit 160 in step 16. The delivery of the stocks by the transaction unit 150 is controlled by the second timing unit 220 such that at the end of the averaging period the stocks are delivered to the investor as soon as practicable and in any event not later than five days.

From the above it has become apparent that although the number of the stocks delivered to the investor may vary depending on the performance of the DAX and the development of the stocks delivered to the investor, the total value of the stocks delivered to the investor only depends on the performance of the DAX. Consequently, the investor not only profits from the annual yield of the note and the discount factor, but also from an increase of the DAX after the note has been issued. In order to realize his profits the investor may sell the stocks delivered to him by the transaction unit 150 immediately upon receipt. Since the transaction unit only delivers liquid blue chip stocks, the delivered stocks can readily be monetized.

The issuer likewise profits from the issue of the note in several ways. First of all, the note is mandatorily exchangeable. Consequently, issue of the note has no negative influence on the issuer's credit rating. Moreover, capital gains tax is deferred until the point of exchange of the note. Moreover, issue of a note based on a portfolio of several stocks captures potential outperformers within the issuer's portfolio since the selection unit 190 preferably selects this stock of the issuer's portfolio which shows the highest performance after issue of the note.

Besides the computer system described with reference to FIG. 1 and the method described with reference to FIGS. 2 and 3, the invention relates also to a computer program with program code means for carrying out the steps of the method according to the present invention when the program is executed on a computer. The invention also covers the computer program with program code means when it is stored on a computer-readable recording medium.

The invention claimed is:

1. A computer system for exchanging a financial note for a quantity of a non-cash financial item comprising:
   a computerized calculating unit for calculating a value of the note based upon a level of an index representative of a first set of one or more non-cash financial items, the value of the note being expressed in a currency; and
   a computerized transaction unit for delivering a quantity of a second, different set of one or more non-cash financial items to the investor in exchange for the financial note, the quantity being based upon a ratio of the calculated value of the note and price of the one or more non-cash financial items in the second set.

2. The computer system according to claim 1, further comprising an index interface for receiving the level of the index.

3. The computer system according to claim 1 or 2, further comprising a price interface for receiving the price of the one or more non-cash financial items in the second set delivered to the investor.

4. The computer system according to one of claims 1 to 3, wherein the calculating unit calculates the ratio (r) according to the equation $$r=I/(x \cdot S),$$

wherein I is the level of the index, x is a discount factor and S is the price of the one or more non-cash financial items in the second set.

5. The computer system according to one of claims 1 to 4, further comprising an averaging unit for averaging the ratio.

6. The computer system according to claim 5, further comprising a first timing unit in communication with the averaging unit, the first timing unit controlling the averaging unit such that the ratio is averaged over a predetermined period of time.

7. The computer system according to one of claims 1 to 6, further comprising an input terminal allowing to input an exchange request.

8. The computer system according to one of claims 1 to 7, further comprising a selection unit for automatically selecting the one or more non-cash financial items in the second set for delivery to the investor from a portfolio of a plurality of non-cash financial items available to the issuer of the financial note.

9. The computer system according to claim 8, further comprising an output unit for notifying the investor of the selected one or more non-cash financial items in the second set for delivery to the investor.

10. The computer system according to one of claims 1 to 9, further comprising a second timing unit in communication with the transaction unit, the second timing unit controlling the transaction unit such that the one or more non-cash financial items in the second set is automatically delivered a predetermined period of time after receipt of an exchange request, after maturity of the financial note or after notification of the investor of the one or more non-cash financial items in the second set selected for delivery.

11. The computer system according to one of claims 1 to 10, further comprising a coupon database for storing data relating to at least one coupon date and a monitoring unit for monitoring the at least one coupon date and is for delivering a coupon to investor at each coupon date.

12. An automated method for exchanging a financial note for a quantity of a non-cash financial item, comprising:

calculating in a computer a value of the note based upon a level of an index representative of a first set of one or more non-cash financial items, the value of the note being expressed in a currency; and delivering a quantity of a second, different set of one or more non-cash financial items to the investor in exchange for the financial note, the quantity being calculated in a computer based upon a ratio of the calculated value of the note and price of the one or more non-cash financial items in the second set.

13. The method according to claim 12, further comprising calculating the ratio (r) according to the equation $$r=I/(x \cdot S),$$

wherein I is the level of the index, x is a discount factor and S is the price of the one or more non-cash financial items in the second set.

14. The method according to claim 12 or 13, further comprising averaging the ratio over a predetermined period of time and delivering the quantity of the one or more non-cash financial items in the second set in accordance with the averaged ratio.

15. The method according to one of claims 12 to 14, further comprising automatically selecting the one or more non-cash financial items in the second set for delivery to the investor from a portfolio of a plurality of non-cash financial items available to the issuer of the financial note.

16. The method according to claim 15, further comprising automatically selecting the one or more non-cash financial items in the second set for delivery to the investor at a time in close proximity with an exchange request or with maturity of the financial note.

17. The method according to claim 15 or 16, further comprising automatically notifying the investor of the selected one or more non-cash financial items in the second set of the issuer's portfolio to be delivered.

18. The method according to one of claims 12 to 17, further comprising automatically delivering the quantity of the one or more non-cash financial items in the second set a predetermined period of time after receipt of an exchange request, after maturity of the financial note or after notification of the investor of the one or more non-cash financial items in the second set selected for delivery.

19. The method according to one of claims 12 to 18, further comprising defining at least one coupon date, storing the at least one coupon date, automatically monitoring the at least one coupon date and delivering a coupon to investor at each coupon date.

20. A computer program with program code means for performing the steps according to one of claims 12 to 19 when the program is executed on a computer.

21. The computer program with program code means according to claim 20, stored on a computer-readable recording medium.

* * * * *